United States Patent [19]

Ahlgren

[11] Patent Number: 4,995,988
[45] Date of Patent: Feb. 26, 1991

[54] METHOD AND APPARATUS FOR THICKENING A SLURRY USING A COMPRESSION PLATE

[75] Inventor: Aaro Ahlgren, Pori, Finland

[73] Assignee: Sunds Defibrator Rauma Oy, Rauma, Finland

[21] Appl. No.: 286,386

[22] Filed: Dec. 14, 1988

[30] Foreign Application Priority Data

Nov. 11, 1988 [FI] Finland .................................. 885228

[51] Int. Cl.$^5$ ..................................... B01D 33/044
[52] U.S. Cl. .................................... 210/784; 210/402; 162/56; 162/210; 162/214; 162/317; 162/329
[58] Field of Search .............. 210/402, 404, 780, 784; 162/56, 60, 210, 214, 252, 259, 289, 311, 317, 329, 327, 328; 68/43

[56] References Cited

U.S. PATENT DOCUMENTS

| 4,085,003 | 4/1978 | Luthi | 162/259 |
| 4,737,277 | 4/1988 | Lenac | 210/402 |
| 4,808,265 | 2/1989 | Luthi et al. | 210/402 |

FOREIGN PATENT DOCUMENTS 55370 3/1979 Finland .

Primary Examiner—Richard V. Fisher
Assistant Examiner—Wanda L. Millard
Attorney, Agent, or Firm—Burns, Doane, Swecker & Mathis

[57] ABSTRACT

Method and drum filter for thickening of slurry and for treatment of the slurry with liquid. The slurry to be thickened is passed onto the filter face of a drum (3) revolving in a basin (3), and the treatment liquid is passed through the pulp web formed on the drum. The consistency of the pulp web is increased by pressing a compression plate (10) against the pulp web. The compression force of the compression plate (10) is produced by means of the pressure of a liquid and/or gas passed to the convex side of the plate. The compression force can be adjusted by adjusting the pressure prevailing in the gas space outside the drum (3).

6 Claims, 2 Drawing Sheets

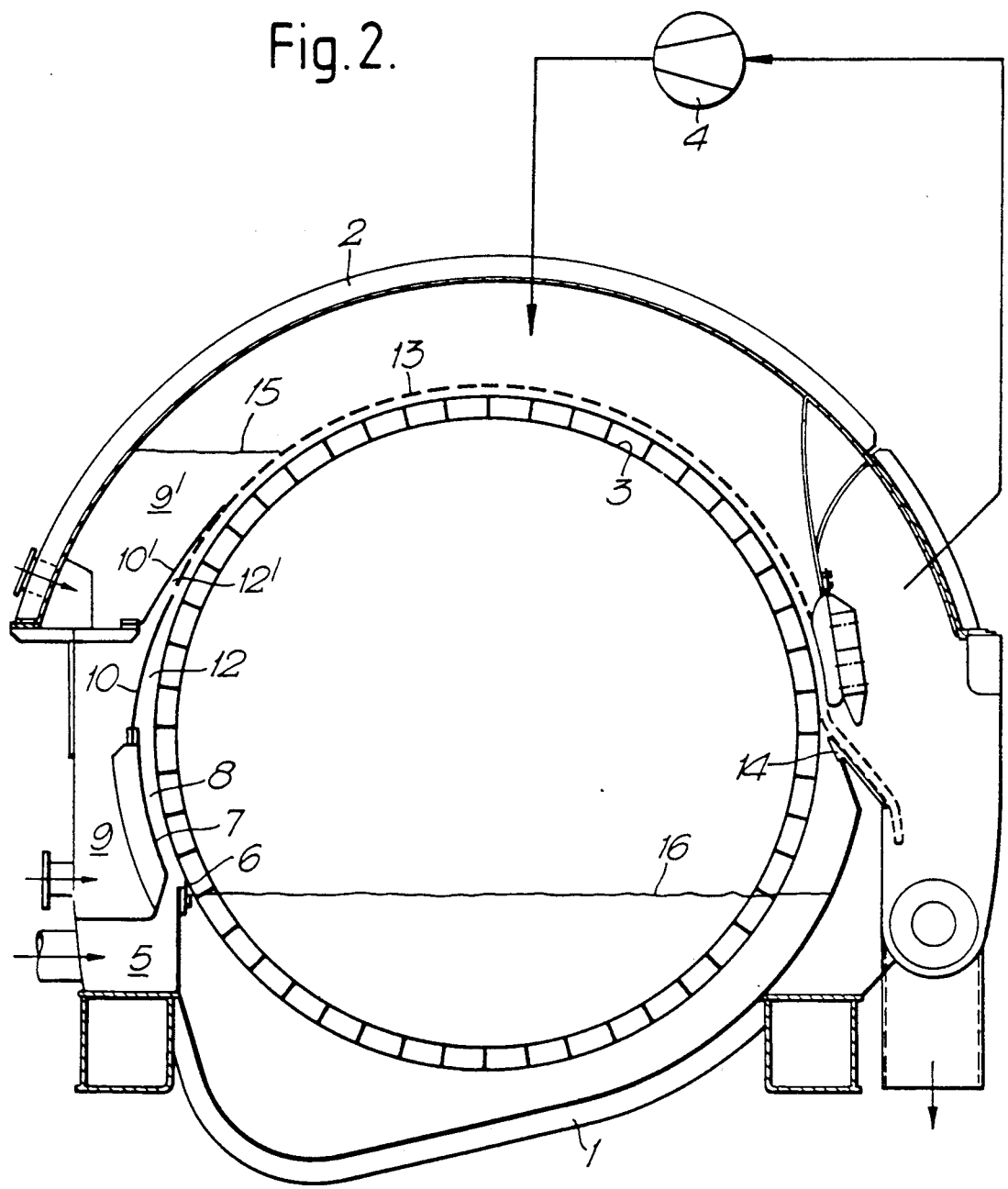

METHOD AND APPARATUS FOR THICKENING A SLURRY USING A COMPRESSION PLATE

The present invention concerns a method for thickening of slurry and for its treatment with liquid, whereat the slurry to be thickened is passed onto the filter face of a drum revolving in a basin and the treatment liquid is passed through the pulp web formed on the drum and whereat the consistency of the pulp web is increased by pressing a compression plate against the pulp web. The invention also concerns a drum filter for thickening of slurry and for its treatment with liquid, which said filter comprises a basin, a filter drum revolving in the basin, a box fitted above the drum, means for producing a positive pressure in the space formed by the basin and by the box, means for feeding slurry onto the outer face of the drum, means for passing the treatment liquid onto the pulp web placed on the drum, means for detaching the thickened pulp web from the drum, as well as means for removing the filtrate from inside the drum, whereat the filter is provided with a flexible plate placed after the pulp-feed point at a distance from the outer face of the drum.

For the thickening and washing of fibrous slurries, in particular of cellulosic fibrous slurry or pulp slurry, filters are used in which the fibrous slurry is thickened on a revolving drum. The fibrous slurry is passed into the feed box of the filter as diluted to an appropriate consistency. The fibrous slurry is thickened by filtration by means of a difference in pressure onto the face of the filter drum, which said face, as the drum revolves, carries the thickened slurry further. Washing water is passed onto the pulp web placed on the drum face, said water passing through the pulp web into the drum while displacing chemicals contained in the pulp.

When attempts are made to increase the capacity of a washing drum by increasing the speed of rotation and the consistency of the pulp web, a problem that is encountered is how to provide a uniform pulp web. If the pulp web becomes uneven, the washing result cannot be made good.

In the U.S. Pat. 4,085,003 a washing drum is described wherein a compression plate to be pressed against the pulp web is employed. By means of the plate, the consistency of the pulp is increased and the uniformity of the pulp web is improved. The plate is provided with rigidifying ribs, and it is pressed against the pulp web by means of actuator members provided at the outer end of the plate. It is problem of this prior-art device that occasionally the washing liquid starts flowing to below the compression plate. This comes from the fact that the compression plate is rigid and is not always placed tightly against the pulp web, especially if the pulp web is uneven.

The object of the present invention is to provide a drum filter wherein the operation of the compression plate is arranged in a simpler and more efficient way as compared with prior art. The method in accordance with the invention is characterized in that the compression force of the compression plate is produced by means of a pressure effective at the convex side of the plate. The drum filter in accordance with the invention is characterized in that the flexible plate can be pressed towards the drum by means of a pressure effective at the convex side of the plate.

By means of a drum filter in accordance with the invention, the consistency of the pulp web can be increased highly efficiently right before the washing, at the same time as a uniform pulp web is provided. This is important in order that a good washing result could be obtained. When the compression force of the plate is produced by means of pressure, no particular actuator member is required. Since a resilient compression plate is also pressed well against an uneven pulp web, the washing liquid has not access to below the plate at the trailing edge of the compression plate.

DESCRIPTION OF THE DRAWINGS

The invention and its details will be described in in the following with reference to the accompanying drawings, wherein.

DETAILED DESCRIPTION OF THE INVENTION

Figure 1:
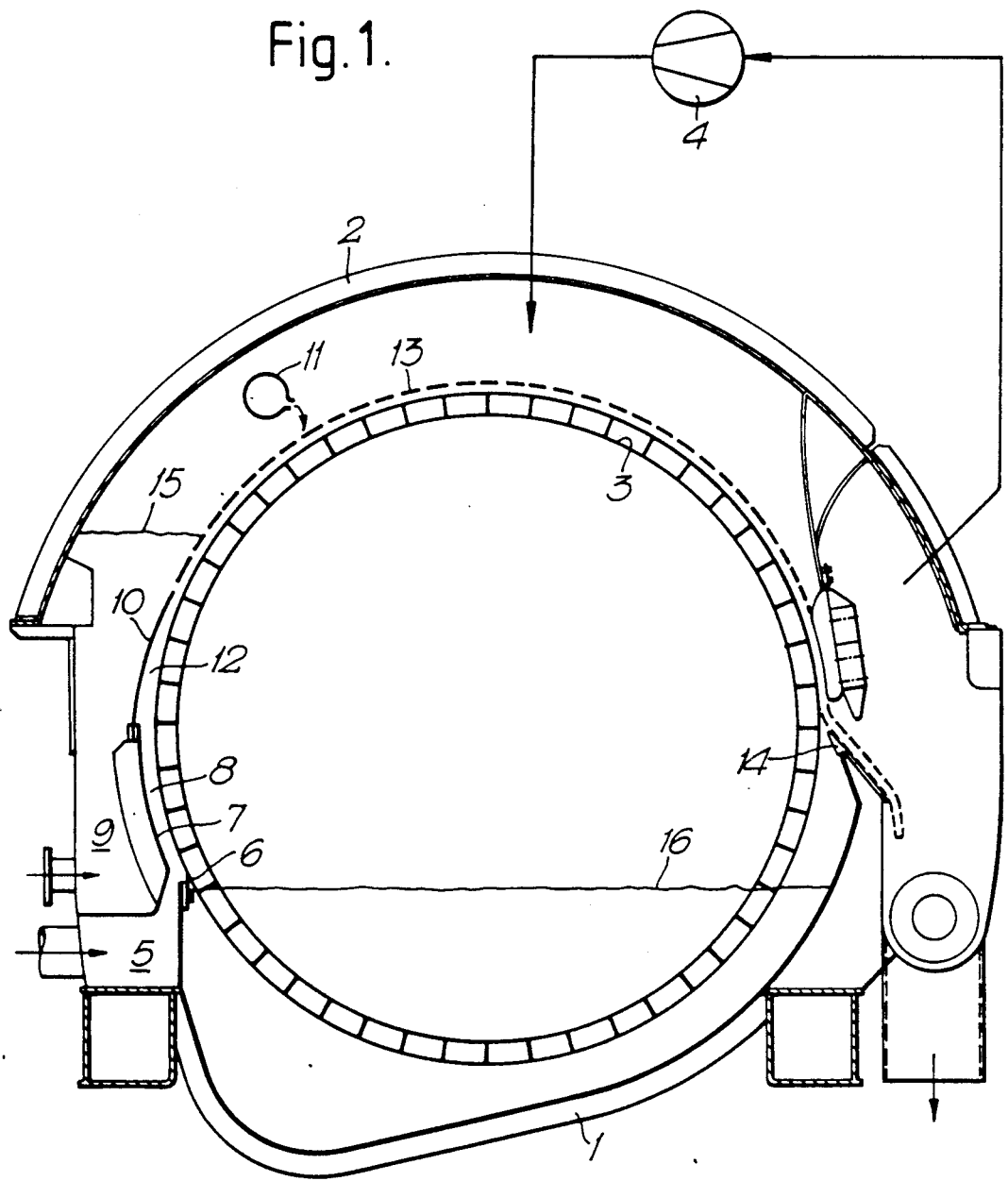
FIG. 1 is a cross-sectional view of one embodiment of the drum filter in accordance with the invention, and FIG. 2 of another embodiment.

The drum filter comprises a basin 1 and, above the basin, a hood 2, which together form a closed space. Into the basin, a revolving drum 3 is fitted, which is provided with a filtering wire face. The filter is provided with a blower 4 so as to maintain a positive pressure in the space defined by the basin and the hood and placed outside the drum. The direction of rotation of the drum is clockwise in the drawing.

In the lower part of the filter, there is a feed box 5 for feeding the pulp onto the drum face. By the effect of the difference in pressure, the filtrate water runs out of the web into the interior of the drum. The drum-side wall of the feed box is sealed by means of a lip seal 6 against the moving face of the drum. The other wall 7 of the feed box follows the shape of the drum at a distance, whereby a pulp-web formation zone 8 remains between the drum and the wall 7.

The washing water of the first washing stage is passed into the space 9 above the feed box, from where it is pressed through the pulp web and the drum into the drum. At the upper edge of the drum-side wall of the washing-water space 9, as an extension of the wall 7, a flexible, resilient plate 10 is attached over the entire length of the drum. The upper edge of the plate 10 can move freely towards the drum, and the pressure of the washing water effective at the convex side of the plate presses the plate against the pulp web.

The washing water of the second washing zone is passed onto the drum face out of the jet pipes 11.

Between the flexible plate 10 and the drum, after the pulp-web formation zone 8, a thickening zone 12 is formed, wherein the plate compresses the pulp and removes liquid out of the pulp. The plate is not provided with any rigidifying members, but it is placed freely against the pulp web depending on the pressure effective at the other side of the plate.

The pulp web 13 continues its run further on the drum face through the second washing zone, and by the effect of the pressure outside the drum water is separated from the pulp web into the drum. At the point 14 the pulp web is detached from the drum face in a way in itself known.

The filtrate water is removed out of the drum.

In the figure, the level of the washing water is denoted with the reference numeral 15, and the level of the filtrate water with the reference numeral 16.

Besides by means of the hydrostatic pressure of the washing water, the compression force of the compression plates can also be affected by means of the air pressure effective inside the hood. By adjusting the air pressure, it is also possible to adjust the compression force.

It is also possible to run the washing stages so that no water from the first stage enters into the space 9, but all the washing water is introduced into the second washing stage out of the jet pipes 11. In such a case, it is only the pressure in the gas space in the hood that acts upon the flexible plate 10.

The material of the plate 10 is most appropriately a synthetic material. It is important that the friction between the plate and the pulp web should be as low as possible in order that the pulp web should follow the moving face of the drum, whose friction is higher than the friction of the plate.

In tests that have been carried out, it has been possible to increase the consistency of the pulp by means of the compression plate from a consistency of 5 to 8% at the initial end of the plate to a consistency of 13 to 16% at the final end of the plate, in other words, one half of the water present in the pulp was removed within the thickening zone.

FIG. 2 shows an embodiment of the invention provided with two separate thickening zones 12 and 12' and with two flexible plates 10 and 10'. The washing water of the second washing zone is passed into the second washing-water space 9' placed above the first washing-water space 9.

The invention is not confined to the embodiments described above alone, but it may show variation in different ways within the scope of the patent claims. The invention can also be applied in single-stage washing, and so also in washing comprising a higher number of washings. Besides to the washing of pulp, it can also be applied to treatment of pulp with other liquids. If necessary, it is possible to fit liquid-collecting basins inside the drum in a way in itself known, in which case the filtrates from the different washing stages can be collected separately and, if necessary, be passed, e.g., to the preceding washing stage.

It is possible to construct a similar compression plate also for a suction washer, in which case the hood is not pressurized but, on the contrary, there is negative pressure inside the drum.

What is claimed is:

1. A method for thickening of slurry and for its treatment with liquid, comprising the steps of:
   passing the slurry to be thickened onto a filter face of a drum revolving in a basin covered by a hood so as to form a space surrounding the drum;
   passing the treatment liquid through the pulp web formed on the drum; and
   increasing the consistency of the pulp web by pressing a flexible compression plate against the pulp web by means of a pressure acting upon the face of the flexible compression plate facing away from the drum, said pressure arising solely from at least one of hydrostatic pressure of the treatment liquid and overpressure of a gas within said space.

2. The method as claimed in claim 1, wherein the compression force of the compression plate is adjusted by adjusting the pressure of said gas prevailing in the space surrounding the drum.

3. A drum filter for thickening of slurry and for its treatment with a liquid, said filter comprising:
   a basin and a hood together forming a space;
   a revolving filter drum mounted in said space;
   means for producing a difference in pressure between the space outside the drum and the space inside the drum;
   means for feeding pulp web slurry onto the outer face of the drum;
   means for passing the treatment liquid onto the pulp web placed on the drum;
   means for detaching the pulp web from the drum;
   means for removing the filtered liquid from inside the drum;
   a flexible compression plate placed after the pulp-feed point at a distance from the outer face of the drum, which flexible compression plate is adapted to be pressed towards the drum by means of a pressure effective at the side of the plate that is facing away from the drum and arising solely from at least one of hydrostatic pressure of the treatment liquid and overpressure of a gas within said space, said flexible compression plate being located so that said pressure acts upon the face of the plate facing away from the drum.

4. The drum filter as claimed in claim 3, wherein the edge of the flexible plate (8) that is placed away from the pulp-feed point can place itself in an appropriate position.

5. The drum filter as claimed in claim 3, wherein several flexible plates have been fitted on the circumference of the drum one after the other.

6. The drum filter as claimed in claim 4, wherein several flexible plates have been fitted on the circumference of the drum one after the other.

* * * * *

UNITED STATES PATENT AND TRADEMARK OFFICE
CERTIFICATE OF CORRECTION

PATENT NO.　:　4,995,988

DATED　　　:　February 26, 1991

INVENTOR(S) :　Aaro Ahlgren

It is certified that error appears in the above-identified patent and that said Letters Patent is hereby corrected as shown below:

ON TITLE PAGE:

Modify item [21] at Page 1 to read:

[21] Appl. No.: 284,386

Signed and Sealed this

Twenty-third Day of June, 1992

Attest:

DOUGLAS B. COMER

*Attesting Officer*　　*Acting Commissioner of Patents and Trademarks*